April 7, 1970  V. W. COPCUTT ET AL  3,504,480
ELECTROSTATIC PRECIPITATOR RAPPER CONTROL SYSTEM
Filed Oct. 21, 1966

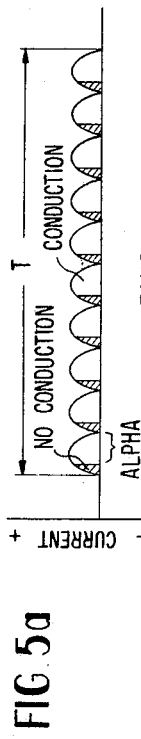
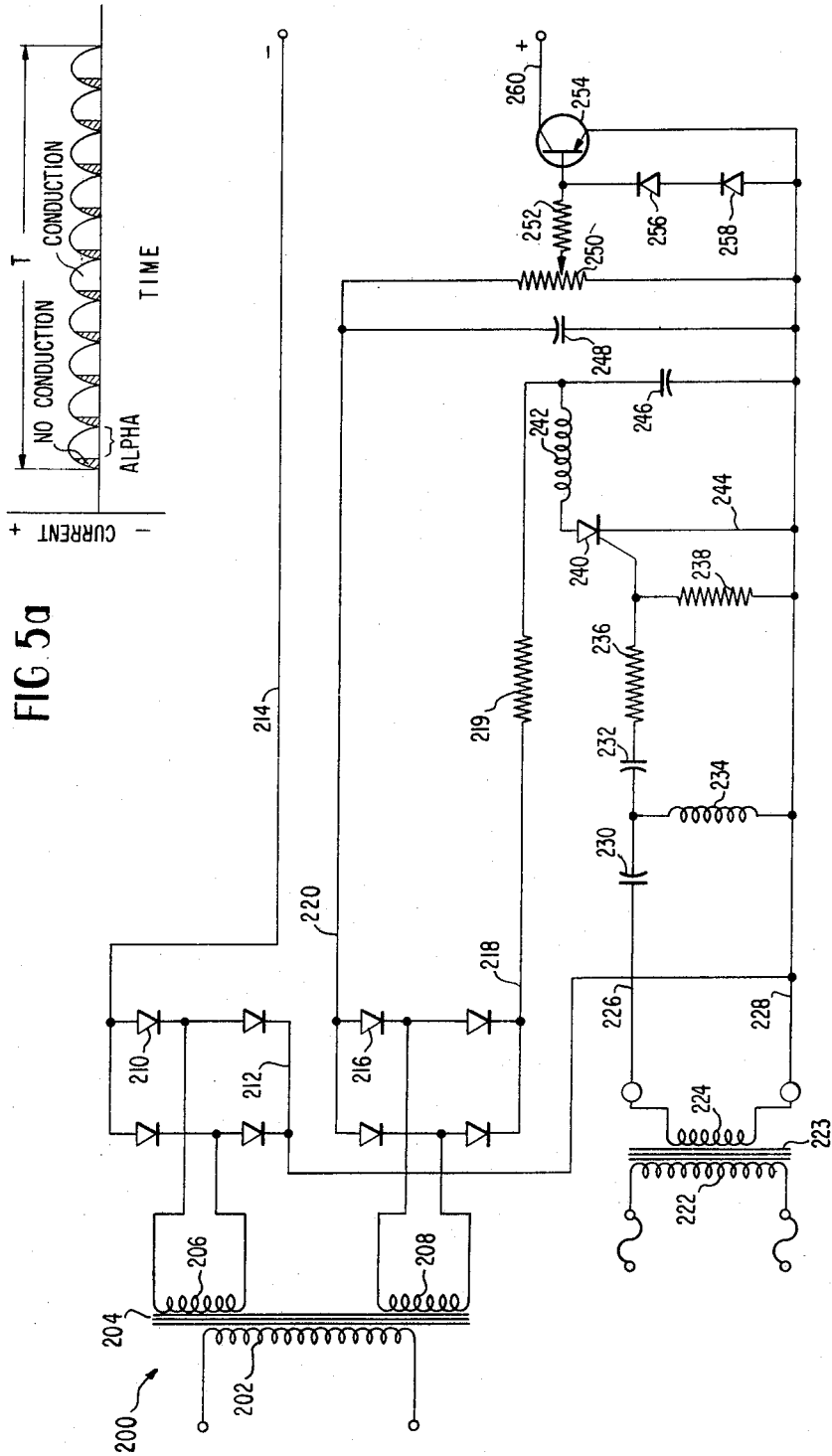
FIG. 5a
FIG. 4

United States Patent Office 3,504,480
Patented Apr. 7, 1970

3,504,480
ELECTROSTATIC PRECIPITATOR RAPPER CONTROL SYSTEM
Vincent W. Copcutt, Basking Ridge, and Herbert J. Hall and Harold Van Hoesen, Skillman, N.J., assignors to Research-Cottrell, Inc., Bridgewater Township, Somerset County, N.J., a corporation of New Jersey
Filed Oct. 21, 1966, Ser. No. 588,440
Int. Cl. B03c 3/76
U.S. Cl. 55—112         10 Claims

ABSTRACT OF THE DISCLOSURE

A system for controlling a plurality of rappers in an electrostatic precipitator. Power is sequentially fed to a plurality of rappers by a distribution switch. The rappers may receive different amounts of power. The firing angle of SCR devices changes power fed to the rappers. The firing angle is controlled by internal feedback signals as well as by external control signals from operating parameters such as precipitator sparking rate and precipitator current. The use of rapper coil current for internal feedback also compensates for changes in line voltage.

---

This invention relates to improvements in the gas cleaning art and more particularly to improvements in electrostatic precipitators for cleaning gases laden with particles, such contaminated gases often arising with the practice of industrial processes of various sorts. Still more particularly, the invention is directed to improvements in rapper controls for electrostatic precipitators.

In the gas cleaning field, electrostatic precipitators have enjoyed a wide range of applications and rather long acceptance, particularly among industrial users because of their efficient, reliable and relatively inexpensive mode of removing particles from gases. Briefly, particle-laden gases are introduced into an area or zone of unipolar gas ions produced by means of a corona discharge maintained between emitting and collecting electrodes; the particles in the gas become rapidly charged by means of collison with ions (or by diffusion in the case of submicron particles) and are thereafter driven by the intense electric field of the corona to the oppositely charged collecting electrodes. The gases exiting from the zone are cleaner than before by the number of particles which have been abstracted from the incoming gases and which adhere to the charged electrodes. It has for some time been recognized by workers in this art that some means must be provided for either continuously or periodically removing these abstracted particles from the electrodes. Otherwise, the efficiency of the electrostatic precipitator would decrease with continued build-up of particles on the electrode. This situation may be considered somewhat analogus to the requirement for the periodic cleaning of filter units in a household vacuum cleaner or a household hot air heating system. Workers in this art have devised a great variety of what are commonly termed rapping devices for striking the electrode in an electrostatic precipitator to impart vibration thereto with consequent dislodgement of the collected particles, the particles falling by gravity to a sump or the like for removal.

According to custom in the art of rapping devices for electrostatic precipitators, it has been the practice to employ one or more rapping devices for each electrode group in the precipitator. Further, where the size of the precipitator is so large as to require separate banks of electrodes axially spaced from each other in the electrostatic precipitator, the rapping devices have often been controlled from a single or central control device or mechanism. For example, in the use of a rapping device whose rapping intensity varies directly with the intensity of the electric current passed therethrough, a single, fixed setting of an electrical potentiometer or other control device has served to regulate the rapping intensity and frequency of all the rapping devices for each of the separate banks of electrodes in large electrostatic precipitators. Thus, workers in this art have generally accepted the use of a single control device for controlling the frequency and/or intensity of the rapping devices for each electrode in an electrostatic precipitator, even though the precipitator may be so large as to require several distinct banks of electrodes with several electrodes in each bank.

According to the practice of this invention, each bank of a plurality of spaced banks of electrodes in an electrostatic precipitator is separately controlled as regards its rapping intensity. The rappers associated with each bank of electrodes are all energized by a suitable mechanism from a single power source and from a single set of current control devices, here assuming the form of silicon controlled recitifiers.

According to one aspect of this invention, each bank of electrodes is provided with a plurality of rapping devices whose rapping frequency is fixed. The intensity of rapping for the various banks of electrodes may be initially manually set to correspond to expected conditions in the particular bank associated therewith. In general, the intensity of rapping will be greater for those electrodes which initially contact and treat the particle-laden gases as compared with those electrodes which are near or at the exit portion of the fluid flow path, wherein in general the rapping intensity is lesser. This difference in rapping intensity follows from the greater particle density condition expected in the first bank(s) as compared with the lesser particle density condition expected in the downstream bank(s).

Also within the contemplation of the present invention, the various separate rapping intensity controls employed in the subject system may be caused to automatically vary their operation with changes in operating conditions. The term "operating conditions" refers to the particular kind of and particle density of particle-laden gases passed through the electrostatic precipitator for cleaning purposes and, as often encountered in practice, these operating conditions may vary during relatively short time intervals over rather wide ranges.

Figure 3A:
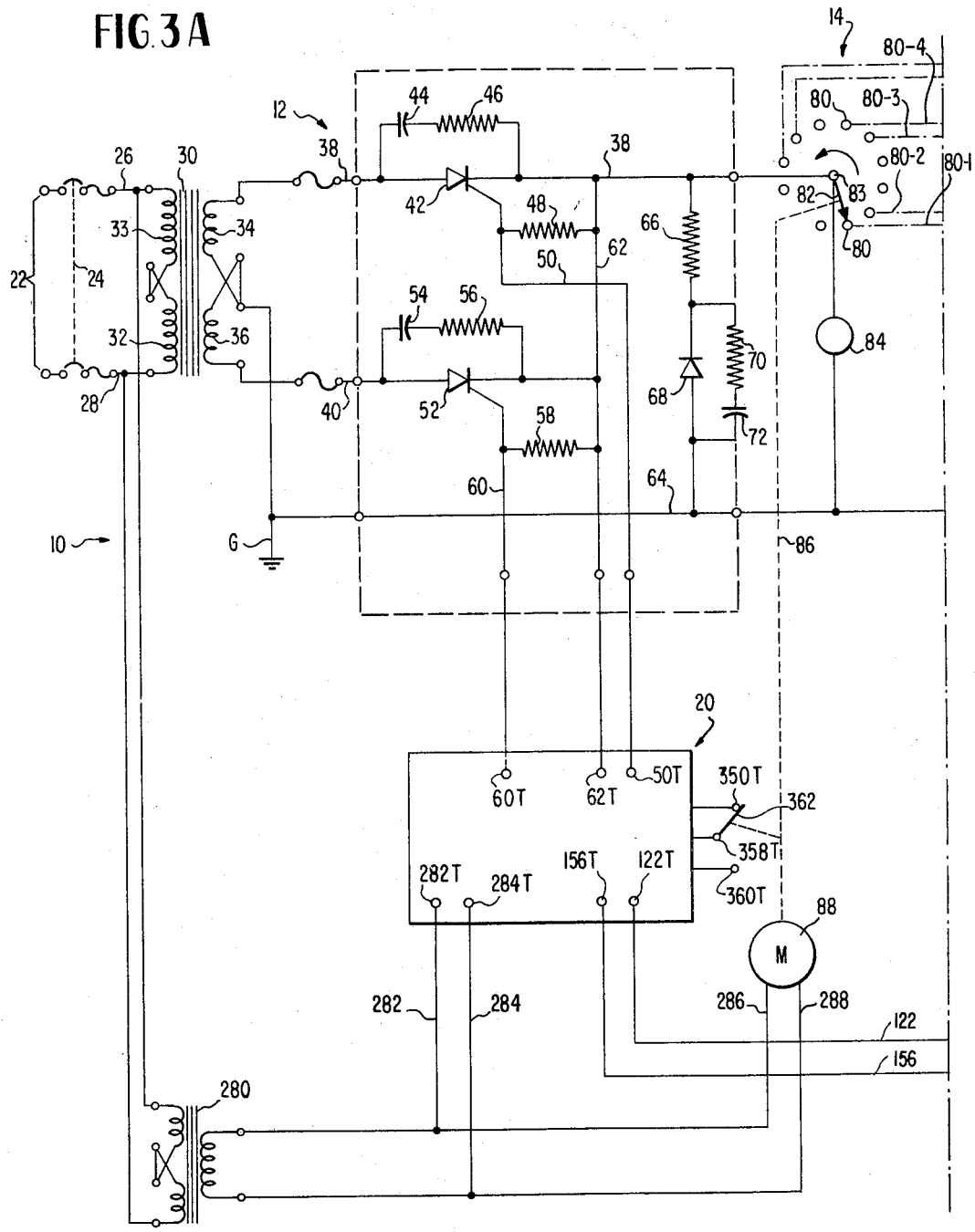
Figure 3B:
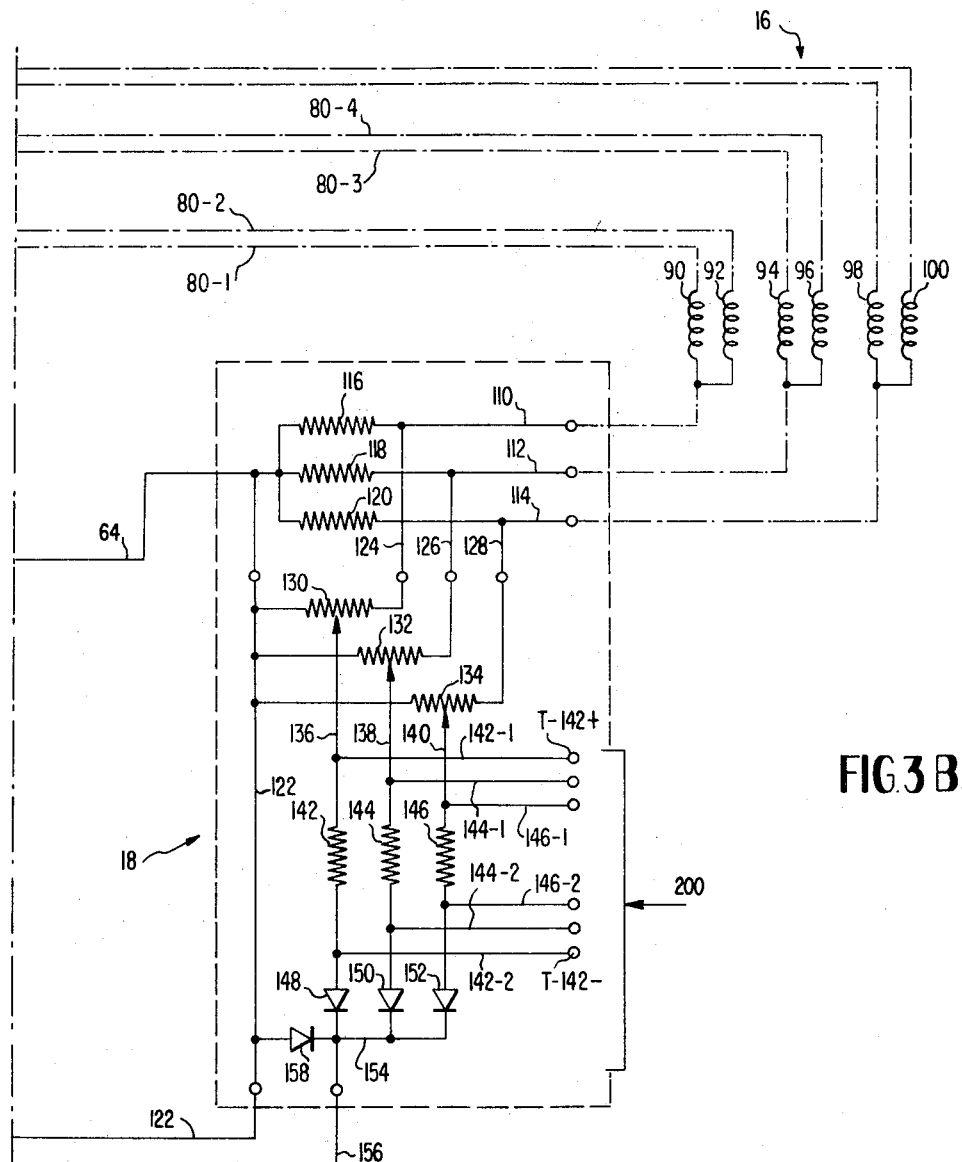

FIGURES 3a and 3b define an electrical circuit of a rapper control system according to the practice of the present invention, these two views to be placed side by side.

FIGURE 4 is an electrical control circuit for automatically varying the rapping intensity with changes in sparking rate.

Figure 4A:
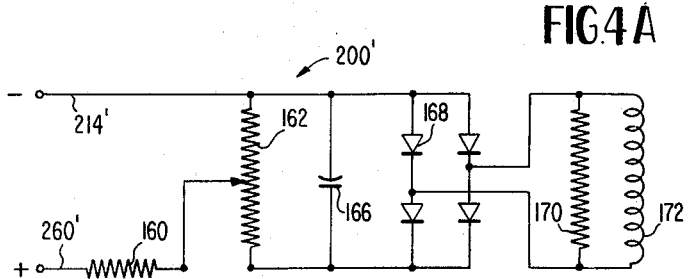

FIGURE 4a is an electrical control circuit for automatically varying the rapping intensity with changes in precipitator current.

Figure 5:
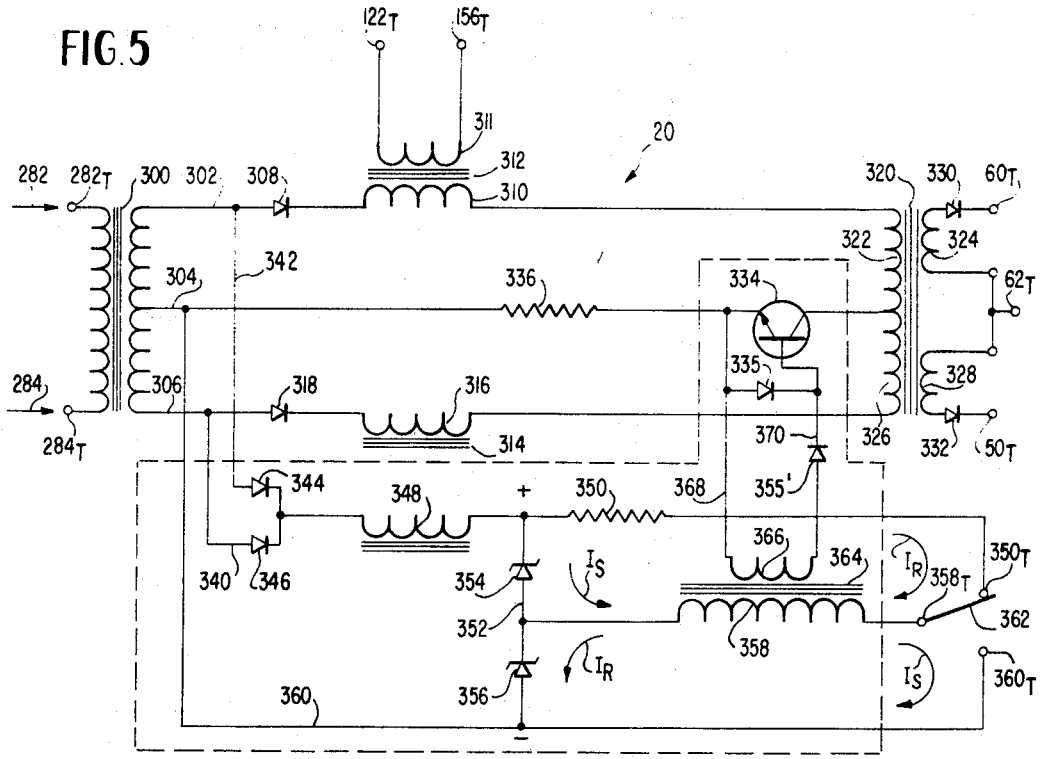

FIGURE 5 is a wiring diagram of the SCR firing control circuit 20 of FIGURE 3a.

FIGURE 5a is an illustration of the pulse length and phase angle control derived by the circuit of FIGURE 5.

Figure 6:
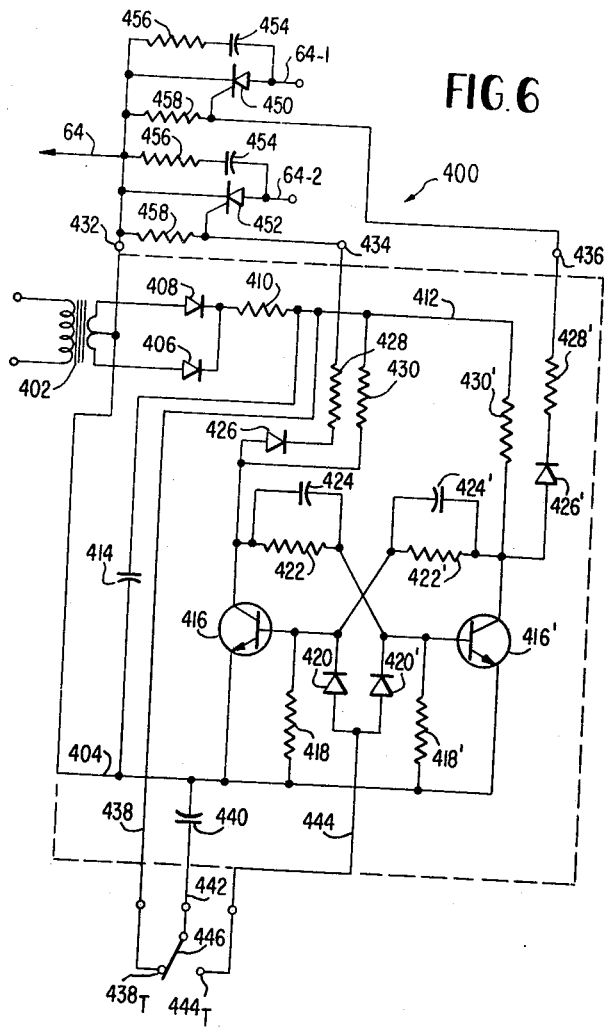
Figure 7:
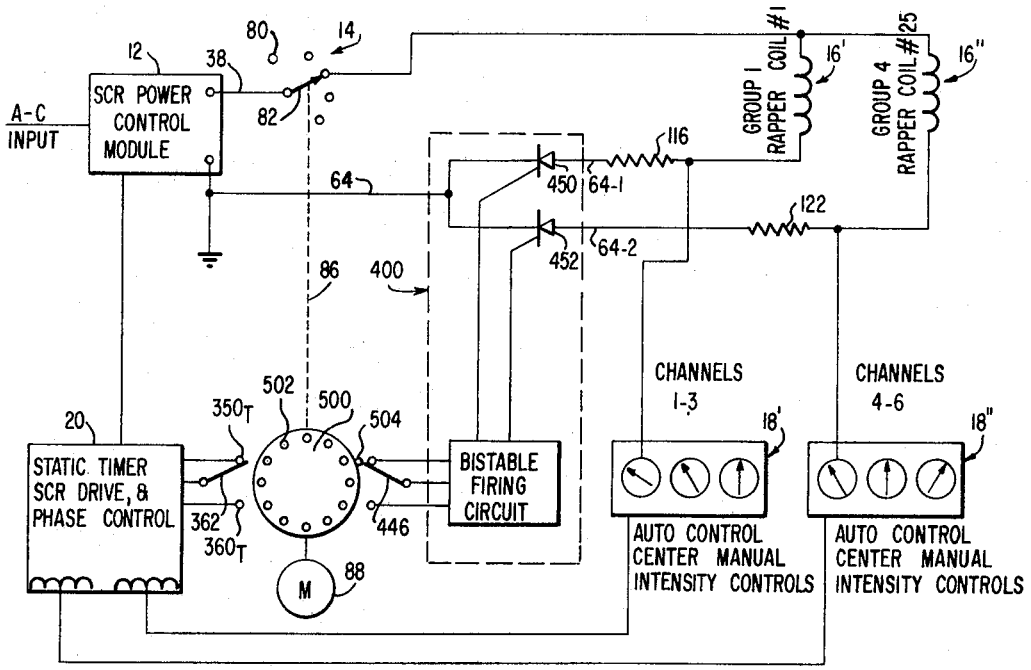

FIGURE 6 is a wiring diagram of a circuit schematically indicated in FIGURE 7.

FIGURE 7 is a schematic view of a modified rapper control circuit, similar to the circuit of FIGURES 3a and 3b.

Figure 1:
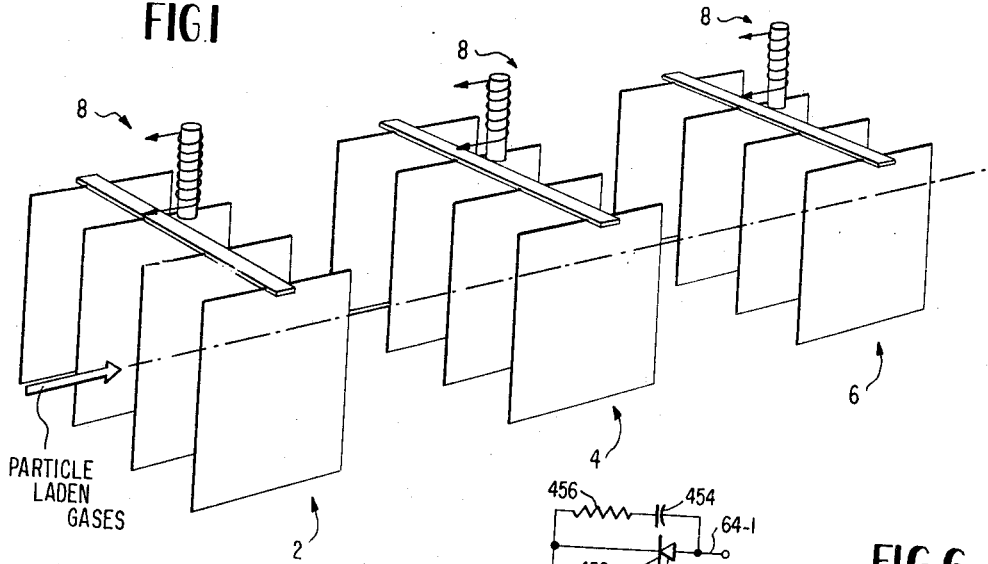
FIGURE 1 is a schematic view of an electrostatic precipitator provided with a plurality of axially spaced banks of electrodes along the flow axis of particle-laden gases fed thereto, each bank having electromagnetic rapping means associated therewith.

Referring now to FIGURE 1 of the drawings, the numerals 2, 4, and 6 each denote a bank of electrodes positioned within an electrostatic precipitator, the banks being axially spaced along the flow path of incoming particle-laden gases. The collecting electrodes only in each bank are shown and are generally parallel to each other, the discharge electrode associated with each collector not illustrated. It will be understood that the discharge electrode as well as the collecting electrode may be vibrated. The numerals 8 each denote an electrically operated rapper associated with each bank, the rapper of each bank positioned with respect to the collecting electrodes of each bank such that the collecting electrodes may be vibrated by the rappers to dislodge particulate material therefrom. It will be understood that the number of collecting electrodes vibrated by each rapper, as well as the number of collector electrodes in each bank, are parameters which may be varied upon fabrication of the electrostatic precipitator to best fulfill the requirements of a specific industrial installation.

Figure 2:
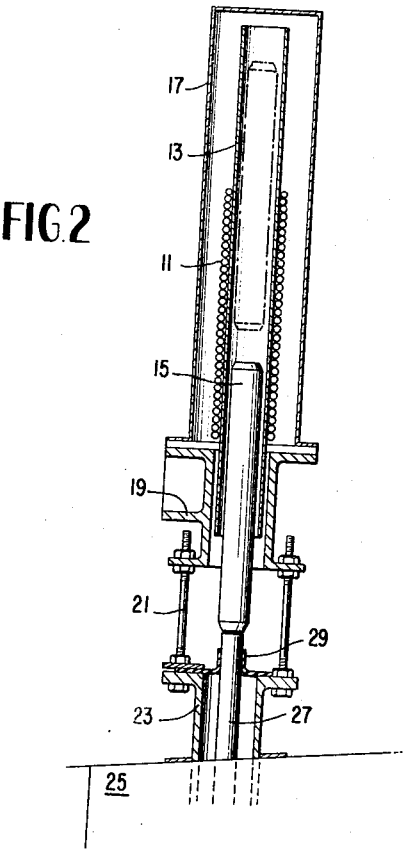
FIGURE 2 is a cross-sectional view of a single electrically operated rapper illustrated as mounted on an electrostatic precipitator.

FIGURE 2 illustrates a typical rapper construction suitable for use with the control circuits of this invention and comprises a solenoid coil denoted by the numeral 11. The coil 11 is wrapped around a tube 13 and surrounds the upper portion of a ferromagnetic plunger 15. A housing 17 extends over the upper end of the solenoid and is mounted upon a bracket 19 whose lower portion is provided with flanges through which pass portions of bolts 21. Another bracket 23, similarly hollow and flanged, receives opposite end portions of the bolts 21 and is mounted on an electrostatic precipitator schematically denoted by the numeral 25. An anvil 27 is shown in the form of an elongated rod whose upper end is surrounded and sealed by a flexible and apertured sealing diaphragm element 29. The anvil rod 27 is suitably secured at its lower end to one or more electrodes in any one of a number of ways well known to workers in this art. The magnetic field within the solenoid due to the energization of coil 11 will cause the plunger 15 to rise upon a signal. The current or energization of coil 11 is later discontinued and the plunger 15 falls due to gravity upon the top of anvil rod 27, with the impulse thereof being transmitted to the electrodes to impart vibration thereto. As was the case in FIGURE 1, the precise structural details of the precipitator 25 are not illustrated, such details being within the knowledge of workers in this art. It will be observed that the solenoid axis is located vertically and that the plunger rests upon the anvil, partially inserted in the lower end of the coil. To obtain a blow of maximum intensity, the coil is momentarily energized and the plunger is accelerated towards the center of the coil. This center may be characterized as that portion of the plunger with respect to the coil where maximum magnetic flux linkages occur in the coil and plunger system. This may also be defined as the position where the magnetic reluctance of the coil-plunger system is a minimum. For a given coil-plunger geometry, the maximum electrical energy fed to the coil to prevent grabbing of the plunger by the coil is experimentally determined, a relatively simple technique. Just prior to reaching this (center) position, the coil is deenergized and the magnetic field collapses. This allows the plunger to coast through the coil, due to inertia, thereby to reach a peak travel position (shown in dashed lines) above the coil. At this position, the potential energy of the plunger is equal to the maximum kinetic energy imparted during the initial acceleration, less losses. From this point, the plunger falls freely by gravity and strikes the anvil. The kinetic energy at the time of plunger impact is equal to the potential energy at the peak travel position, less frictional losses of the downward descent. For raps of less than maximum intensity, the energy fed to the solenoid coil is lesser and the plunger does not rise as high as shown in the dashed view.

It is apparent that the coil energization pulse, in order to realize the above-described mode of operation, must be quite accurately controlled as regards its duration and its magnitude. With the solenoid and plunger geometry employed in a typical installation, and energization from a 60 cycle source, it has been found preferable to maintain a fixed energization pulse length, and vary rapping intensity by varying the pulse magnitude. This mode of control permits stepless control of rapping intensity, as compared to, say, 10 or 12 discrete values which would be available by controlling the number of positive half-cycles passed through the rapper coil.

Referring now to FIGURES 3a and 3b of the drawings, the numeral 10 denoted generally the main rapper control circuit of this invention, as shown in both of these drawings, and includes as subcombination circuits thereof a circuit generally denoted by the numeral 12, which is a silicon controlled rectifier (SCR) power control module circuit. The numeral 14 denotes generally a rotary switching circuit. The numeral 16 denotes generally a circuit comprised of a plurality of rapper coils for the electrodes of an electrostatic precipitator. The numeral 18 denotes generally an automatic feedback control circuit. The numeral 20 denotes generally a firing control circuit for the SCR units in circuit 12, the details of the former being illustrated in FIGURE 5.

The attention of the reader is now directed to the input to the circuit 12, the former including a pair of terminals 22 adapted to receive alternating current power, as for example, 460 or 230 volts, 60 cycles per second, from a single phase source. A conventional circuit breaker is denoted by the numeral 24 and is coupled to electrical leads 26 and 28. A transformer is coupled to these lines and bears the numeral 30, the transformer including two primary windings 32 and 33 and two secondary windings 34 and 36. The secondary is center tapped, with the center being coupled to ground G, as indicated. The upper terminal of winding 34 feeds into line 38 and the lower terminal of the lower winding 36 feeds into line 40. Within circuit 12, the numeral 42 denotes a silicon controlled rectifier (SCR), generically termed a thyristor, having its anode and cathode connected in series with line 38. Shunted thereacross is a capacitor 44 and a resistor 46. The numeral 48 denotes a resistor having one end coupled as illustrated to the gate of SCR 42, the coupling being made to line 50. The numeral 52 denotes a second SCR having its anode and cathode series coupled in line 40. The capacitor 54 and resistor 56 are shunted across the SCR 52 as indicated, in a manner identical with capacitor 44 and resistor 46 of SCR 42. The numeral 58 denotes a resistor one end of which is coupled to the gate of SCR 52 through line 60. The other ends of resistors 48 and 58 are coupled to line 62. It will be observed that line 64, the center tap line of the secondary of transformer 30, may be regarded as the ground line by virtue of its connection to ground G. A resistor 66 is in series with a diode 68, with this series circuit being coupled across lines 38 and 64. A capacitor 72 and a resistor 70 are shunted across diode 68. As will become apparent from the description to follow, the resistor 66 and diode 68 provide a path for inductive currents in rapper coils 90–100, these currents arising upon cessation of energization of these coils. Without diode 68, magnetic energy stored in these rapper coils might destroy the SCR units 42 and 52 by reverse voltage breakdown. Resistor 66 acts to reduce the L/R discharge time constant of the rapper coils. The resistance-capacitance combinations across the elements 42, 52, and 68 are transient suppressors. Resistors 48 and 58 provide stabilizing resistive bias by diverting internally generated leakage currents from the base region of the gate circuits.

Referring now to the circuit elements denoted by the numeral 14, the numeral 80 denotes any one of a plurality of switch contacts which are coupled through lines 80-1, 80-2, 80-3, 80-4, etc., to the various rapper coils in subcombination circuit 16. The numeral 82 denotes a rotating electrical contact arm whose free end makes at various positions thereof electrical contact with the contacts 80. It will be observed that electrical energy passing through line 38 enters the stationary end 83 of rotating electrical contact 82 and, depending upon which contact 80 is being contacted by the end of arm 82, is passed through either the line 80-1, the line 80-2, the line 80-3, etc. The numeral 84 denotes a pilot light of substantially high resistance and serves to give a visual indication that electrical impulses are being transmitted to the various lines 80-1, etc., i.e., that lines 38 and 64 are energized. As indicated by the dashed line 86, a mechanical coupling is provided between a motor 88 and the rotating arm 82, the coupling being such that rotation of motor 88 imparts rotation, as indicated by the curved arrow, to the switch arm 82.

Referring now to the subcombination generally denoted by the numeral 16, the numerals 90, 92, 94, 96, etc., denote electrical rapper coils such as 11 of FIGURE 2. The coils 90, 92, etc., are entirely analogous to the coils 8 of FIGURE 1. The coils 90 and 92 are positioned at one bank of collecting electrodes, while coils 94 and 96 are connected to another or a second bank of collecting electrodes. Similarly, the remaining coils 98 and 100 are connected to still another bank of collector electrodes.

The attention of the reader is now directed to the subcombination generally denoted by the numeral 18, which includes electrical lines 110, 112, and 114. Line 110 is coupled to the other ends of the coils 90 and 92, these being the rapper coils in the first group; with line 112 being coupled to coils 94 and 96, and line 114 being coupled to coils 98 and 100.

Resistor 116 is placed in line 110, resistor 118 in line 112, and resistor 120 in line 114, and it will be observed that the left ends of these three resistors are connected to a common point on line 64. Before proceeding further with the description of circuit 18, the reader will now observe that a complete electrical current path is now defined from line 38, thence through the switch arm 82 to any one of the terminals 80, thence through one of the lines 80-1, 80-2, etc., to one of the coils 90, 92, 94, 96, 98, or 100, through one of the lines 110, 112, 114, through one of the resistors 116, 118, or 120, and finally to the return or ground electrical wire 64.

Continuing with a discussion of subcombination circuit 18, line 122 is coupled to line 64 and also to circuit 20, lines 124, 126, and 128 are connected at their upper ends respectively to lines 110, 112, and 114. The lower ends of these lines are connected respectively each to an end of potentiometers 130, 132, and 134, with the other ends of these potentiometers being coupled, as indicated, to line 122. The tap terminals of these potentiometers are secured respectively by lines 136, 138, and 140, the latter coupled to resistors, respectively, 142, 144, and 146. The lower ends of these resistors are coupled to diodes 148, 150, and 152 respectively, the function of the diodes being to isolate each control channel from the others. The lower portions (cathodes) of the diodes are connected to line 154 which, in turn, is connected to line 156 the latter also feeding into subcombination circuit 20. A diode 158 is coupled, as indicated, between lines 122 and 156 with the anode being coupled to line 122 and the cathode being coupled to line 156.

Lines 142-1 and 142-2 are connected in shunt across resistor 142, lines 144-1 and 144-2 are connected in shunt across resistor 144, and lines 146-1 and 146-2 are connected in shunt across resistor 146. These shunt lines are each coupled to terminals such as terminals T-142, plus and minus. The numeral 200 denotes an automatic control circuit, illustrated in detail in FIGURE 4, adapted for connection to terminals T-142, etc., associated with resistors 142, 144, and 146.

Referring now to FIGURE 4 of the drawings, the numeral 200 denotes generally an automatic control circuit, preferably in the form of a modular assembly as, for example, a printed circuit, which is adapted to cooperate with circuits 18 and 20 to vary the action of the rappers which strike the various electrodes in the electrostatic precipitator. More particularly, the automatic control circuit denoted generally by the numeral 200 is responsive to changes in spark rate to vary the rapping action by automatically changing the input to phase and intensity control circuit 20. A change in operating conditions will often change the sparking rate of the precipitator and, accordingly, the sparking rate may be sensed and variations thereof used as a control parameter.

In the circuit 200, the numeral 202 denotes the primary of a transformer 204 with the secondary thereof including two windings 206 and 208. The numeral 210 denotes any one of four diodes coupled to the secondary 206 in the indicated configuration, with the arrangement being such that the diodes 210 effect full wave rectification, the lower line 212 being positive and the upper line 214 being negative. Secondary 208 is also linked to a rectification network including four diodes 216 coupled in the indicated configuration so that the line 218 is positive and line 220 negative.

The numeral 222 denotes the primary of a step-down transformer 223 whose primary is coupled to lines which supply the primary of a high voltage transformer (not illustrated) supplying power to the electrostatic precipitator. The numeral 224 denotes the secondary of transformer 223 and is coupled to electrical leads 226 and 228 feeding into a T-filter composed of capacitors 230 and 232 and an inductance 234. The purpose of the filter is to separate the transients induced in the secondary 224 by sparking of the precipitator from the 60 cycle AC energy, the filter suppressing the 60 cycle but passing the sparking-induced transients.

A current limiting resistor 236 is placed in line 226 and a bias resistor 238 is shunted across lines 226 and 228 to provide proper biasing potential for SCR 240, here functioning as a switch. The anode of the SCR is coupled to an inductance 242 and the cathode is coupled to line 228 through line 244. A condenser 246 is coupled between the other end of the inductance and line 228. Integrating capacitor 248 is coupled between line 220 and line 228, similarly, a potentiometer resistance 250 is coupled between lines 220 and 228 with the variable tap of the potentiometer in series with a resistance 252, the other end of which is coupled to the base of transistor 254. Diodes 256 and 258 are connected as indicated between the base of transistor 254 and line 228, the purpose of the diodes being to prevent a reverse bias on the transistor and also to limit the signal thereto. The emitter of transistor 254 is also coupled to line 228, the collector coupled to line 260.

Turning now to the mode of operation of the circuit 200 illustrated at FIGURE 4, the transformer 204 supplies the two windings 206 and 208 of the secondary, with diode elements 210 rectifying the alternating current from coil 206. It will be apparent that the output of transistor 254 appears across lines 214 and 260, and that this output power will be dependent upon the conductive state of the transistor, with the conductive state being controlled by the current flow to the base of the transistor.

During operation, the secondary coil 208 of transformer 204 supplies power to the rectifier circuit which includes diodes 216. Normally, condenser 246 is fully charged and condenser 248 is substantially discharged. Further, the base current of transistor 254 is substantially zero so that the transistor is normally non-conducting, i.e., no current is passing from the emitter to the collector and no potential appears between lines 214 and 260. Further, during normal conditions the T-filter comprising capacitors 230 and 232 and inductance 234 effectively filters out the 60 cycle current induced in lines 228 and 226 by transformer 223 so that the gate potential on SCR 240 is normally such as to preclude firing.

Upon sparking of the electrostatic precipitator, the spark-transient signals are passed by the T-filter and when the amount of current passing through resistance 238 is great enough, a potential drop thereacross of predetermined amount appears whereupon the gate of SCR 240 causes it to fire, thus permitting conduction. Upon conduction of the SCR, the capacitor 246 resonantly discharges through the circuit defined by the inductance 242 and the anode-cathode path (now of essentially zero resistance) of SCR 240. This, together with the unfiltered DC potential in lines 218 and 220, causes conduction of SCR 240 to cease upon completion of the discharge of condenser 246. It will be observed that the inductance 242 causes the polarity of condenser 246 to reverse after dischange, thus precluding conduction through the anode-cathode path of SCR 240. Condenser 246 is rapidly recharged from lines 218 and 220 through integrating capacitor 248 and resistance 219. During each discharge of condenser 246, a small increment of charge is added to condenser 248, thus causing the latter's voltage to increase. Condenser 248 slowly discharges through resistance 250.

For a given sparking rate in the precipitator, the electrical charges added to and discharged from condenser 248 will result (in a short interval of time) in the reaching of an equilibrium potential across the condenser 248. This equilibrium potential will therefore correspond to a particular sparking rate.

Transistor 254, coupled in the common emitter configuration, functions to amplify the potential across condenser 248. The collector current increases as the voltage across condenser 248 increases. Resistor 252 limits the base current to transistor 254.

Automatic increase in rapping intensity with increase in precipitator sparking rate is accomplished by coupling line 260 to terminal T–142 (plus) with line 214 of FIGURE 4 coupled to terminal T–142 (minus) of FIGURE 3b. In this manner, increased sparking rate reduces the net current passing from line 156 of FIGURE 3b to phase control circuit 20 of FIGURE 3a, with a consequent increase in current fed to the rapping coils 90–100.

It will here be observed that should it be desired to decrease the rapping intensity with increase in sparking rate, the connections from lines 214 and 260 of FIGURE 4 would be reversed in polarity with respect to terminals T–142 (plus) and T–142 (minus) of FIGURE 3b.

Each group of rapper coils (three groups having been illustrated) is controlled by a circuit such as shown in FIGURE 4. Thus, a circuit identical to that shown in FIGURE 4 is coupled with the collector of its amplifying transistor 254 to line 144–1, with its line 214 connected to line 144–2. In a similar manner, any desired number or rapper coil groups (channels) may be separately controlled.

A portion of the current in line 110 is taken through line 124 to potentiometer resistance 130. After passing therethrough, it passes to line 64 and thence to ground. The adjustable tap on resistor 130 is connected to line 136 which includes resistance 142 and signal isolating diode 148. Current through line 136 passes through line 156 to circuit 20, thence back to line 122 and then to ground line 64. Thus, depending upon the setting of tap line 136 on resistance 130, the amount of current passing through rapper coil 90 is automatically controlled by the negative feedback current flowing in lines 156 and 122 to circuit 20.

Assuming manual control only, i.e., with the circuit 200 not coupled to resistor 142 and hence no external input to lines 142–1, 142–2, etc., through circuit 200, the operation of the circuit is as follows. Assume that the particular electrode associated with the rapper coil 90 is to be struck a certain amount to thereby discharge particulate material therefrom. With the arm 82 in the indicated position, the contact 80 is energized and during the dwell time of arm 82 on contact 80, a certain number of rectified half-waves are permitted to pass to line 38 from the SCR units 42 and 52 by the firing trigger pulses to the gates thereof supplied by circuit 20. These pulses will appear as firing pulses and, for SCR 42, will appear as pulses between lines 50 and 62. For SCR 52, these pulses will appear across lines 60 and 62. The plunger associated with coil 90 will then be lifted by virtue of electromagnetic induction forces and, upon the cessation of the gate signals to SCR units 42 and 52 during the dwell time of arm 82 on contact 80, the plunger will descend by force of gravity and strike the electrode to discharge particulate material accumulated thereon.

Assume now that the arm 82 has swung around in the indicated direction until it communicates with the contact associated with line 80–4, this line connected to rapper coil 96. Current now passes from line 38 through the rapper coil 96 and through line 112 to resistance 118 and thence to ground through line 64. A portion thereof, as before, is shunted from line 112 through line 126 to resistance 132, thence back to ground through line 64. Another portion, depending upon the setting of tap line 138 with respect to resistance 132, will pass through resistance 144, diode 150, line 154, line 156, to the circuit 20, and back through line 122 to ground line 64. Normally, the bank of electrodes or the electrode associated with rapper coil 96 would not require as heavy a rap to dislodge particulate material therefrom, since it is downstream of the flow path through the electrostatic precipitator. Accordingly, the setting of line 138 on resistance 132 would often be different from the corresponding setting on resistance 130, and the feedabck current fed to circuit 20 would be such that the SCR units 42 and 52 would pass current at a later phase angle, thereby resulting in a lower current impulse to coil 96 than that which passed through coil 90 in the first example. The plunger associated with rapper coil 96 would thereby rise to a lesser height before the cessation of the conduction of SCR units 42 and 52 and would, therefore, strike the associated electrode(s) with less force.

A similar mode of operation will be apparent with respect to either of coils 98 or 100 of the third group of rapper coils.

From the above, it will be apparent that the subcombination circuit 18 functions to individually control the rapping intensity of the various rappers and, further, that the individual rapping intensities may be manually set by the potentiometers 130, 132, and 134. In addition, an operating parameter such as sparking rate may be employed by using the circuit 200 of FIGURE 4 to automatically vary the individual rapping intensities by overriding the manual settings. Other operating parameters, however, may be employed, such as precipitator current. The circuit of FIGURE 4a, denoted in general by the numeral 200′, illustrates a circuit analogous in operation to circuit 200, but employing precipitator current as the control operating parameter. As with circuit 200, lines 214′ and 260′ are lines adapted to be coupled to terminals T-142 (plus) and T-142 (minus). Resistor 160 and potentiometer 162 are coupled as indicated and capacitor 166 placed across 162. Diodes 168 rectify AC current across resistor 170 supplied by a secondary transformer coil 172, the primary of which is series connected with the primary of the (not illustrated) high voltage transformer supplying the precipitator. The average potential across condenser 166 is proportional to the precipitator current. With no current signal, the magnitude of the rapper blow is a maximum, with increasing current in the precipitator, the voltage across condenser 166 increases, line 260′ becomes positive with respect to line 214′, thereby aiding the current through resistance 142 (FIGURE 3b) and the intensity of the rapping blow diminishes.

Turning now to FIGURE 5 of the drawings, a description will now be given of the subcombination circuit 20 of FIGURE 3a. This circuit controls the number of positive half-cycles to energize a particular rapper, fed into line 38 (FIGURE 3a) from SCR units 42 and 52 also for controlling (along with the feedback current from circuit 18) the conduction time or phase of each of SCR's 42 and 52 relative to the positive half-cycles which are impressed on them from transformer windings 34 and 36. With the parameters employed in a typical construction, the circuit 20 will allow SCR units 42 and 52 to pass $10\pm\frac{1}{2}$ positive half-cycles for energizing each activated rapper coil. The circuit 20 also controls the phase angle of conduction through thyristors 42 and 52 with respect to the half-cycles which are passed. In a typical installation, circuit 20 allows conduction over approximately 110 to 170 degrees of each half-cycle. Thus, circuit 20 performs the dual functions of (a) determining the number of positive half-cycles fed to each rapper coil to thereby set the pulse width, i.e., the duration of each rapper coil energizing pulse and (b) determining the conduction angle of each of the half-cycles in the pulse to thereby vary the pulse height, i.e., the amount of current fed to each rapper coil. This latter action is illustrated at FIGURE 5a wherein the number of positive half-cycles passed by each thyristor 42 or 52 represents the length of the current pulse, denoted by T. Alternate thyristors 42 and 52 pass alternate half-waves. The conduction angle alpha is varied to change the average rapper coil current, the shaded portion at the beginning of each half-cycle representing input to the respective thyristor which is not utilized.

Power input lines 282 and 284 (FIGURE 3a) from transformer 280 are coupled to input terminals $282_T$ and $284_T$ of transformer 300, the secondary of which includes lines 302, 304 (center tap), and 306. Diode 308 is in series with secondary coil 310 of control transformer 312, the primary coil 311 of which is coupled across terminal $122_T$ and $156_T$. These terminals are connected to lines 122 and 156. These latter lines, it will be recalled, carry feedback current which has been siphoned off or shunted from the return current path from the rapper coils.

Line 306 contains transformer 314 whose secondary winding 316 is in series with diode 318. The primary of transformer 314 is the same winding 311 of transformer 312. Primary coil 326 supplies secondary coil 328 and primary coil 322 supplies secondary coil 324, both of transformer 320. Diodes 330 and 332 are positioned as indicated in these secondary coils, the output of the latter coupled to terminals $50_T$, $60_T$, and common terminal $62_T$. The gates of SCR units 42 and 52 are coupled to these terminals, with $62_T$ coupled to common line 62.

The numeral 334 denotes a transistor, here illustrated as a npn type, with the collector connected to a center primary tap of transformer 320 and with the emitter coupled to resistance 336 in line 304. A diode 335 is coupled as indicated across the emitter-base of transistor 334.

A line 340 is taken from line 306, while line 342 is taken from line 302. Diodes 344 and 346 are coupled as indicated, with the cathodes thereof connected together and leading to an inductance 348. From the inductance, a resistor 350 leads to terminal $350_T$. Feeding from the right portion of inductance 348 is a line 352 having Zener diodes 354 and 356 coupled in the indicated configuration. Primary winding 358 of magnetic timing transformer 364 leads from between the Zener diodes to terminal $358_T$. Terminal $360_T$ is coupled to line 360, the latter feeding from center tap line 304 of transformer 300. SPDT switch arm 362 is coupled to terminal $358_T$ and assumes a position either on terminal $350_T$ or terminal $360_T$. The free end of arm 362 is adapted to be engaged by mechanical means, such as a cam on a rotating member, to alternately swing back and forth between terminals $350_T$ and $360_T$ under the action of motor 88, indicated schemically by dotted line 86 of FIGURE 3a.

To understand how circuit 20 controls the firing of SCR units 42 and 52 of FIGURE 3a, consider initially transistor 334 to be removed and the emitter and collector terminals there of connected together so that there is a continuation of line 304 from transformer 300 to the center of transformer 320. Transformer 300 provides circuit isolation and proper voltage levels and a center-tap source for obtaining one trigger pulse in synchronism with each half-cycle of the alternating current from the primary of transformer 300. The firing triggers or pulses for thyristors 42 and 52 are developed by switching reactors 312 and 314, in conjunction with diode rectifiers 308 and 318. In this connection, it will be observed that switching reactors 312 and 314 may be regarded as saturable core devices, synonomously, magnetic amplifiers, controlled by control winding 311. Broadly, they may also be termed transformers. The phase angle of the firing trigger or firing pulse is varied by the degree of saturation of the core of transformers 312 and 314. This, in turn, is determined by the (feedback) current in primary coil 311, this current derived from lines 122 and 156.

In the absence of control current in coil 311, the cores 312 and 314 are fully saturated and a full 180 degrees firing pulse appears across the gate circuits of both thyristors 44 and 42 by way of transformer 320. This will be apparent when one recalls that terminals $60_T$ and $50_T$ are alternately positive and negative. Transformer 320 insulates the firing circuit from the power circuit 12 and also isolates the two thyristor units 42 and 52 from each other. Diode rectifiers 330 and 332 prevent reverse current flow. The firing pulses for thyristors 42 and 52 pass from transformer 300 alternately through diode 308 and winding 310, and diode 318 and winding 316, all to the pulse transformer 320 and the pulse is returned through the center line 304 through limiting resistor 336.

The dashed portion of circuit 20 is energized from transformer 300 by lead-off lines 342, 340, and 360, utilizing diode rectifiers 344 and 346 and also filter choke 348 to provide a direct current source necessary for operation. The Zener diodes 354 and 356 stabilize the direct current at the output of diodes 344 and 346 against variations in the alternating current supply and are arranged in a bridge configuration with two current paths. Each Zener diode may be regarded as a source of potential. The firing time interval for the thyristors 42 and 52 is set or determined by the volt-second requirements of the core of saturable core device 364 and winding 358 thereof. In this connection, it will be observed that core device 364 may be regarded as a magnetic timing element. Initially, the core of 364 is fully reset by current flowing through resistor 350, terminal $350_T$, arm 362, contact $358_T$, winding 358, and diode 356. This is indicated by arrow $I_R$. Transistor 334 is in the non-conducting state at this time. A burst of firing pulses for thyristors 42 and 52 is supplied by arm 362 being thrown against contact $360_T$. This permits the magnetizing current $I_S$ to flow through the winding 358 in the reverse direction (opposite to current $I_R$) until saturation of the core of transformer 364 occurs. During this period, the core flux change produces a voltage in winding 366 which turns transistor 334 to the conducting state via conductors 368 and 370 and allows firing pulses for thyristors 42 and 52 to appear across $50_T$, $60_T$, and common terminal $62_T$. Upon saturation of the core, the core flux change ceases, the voltage across winding 358 diminishes to zero, and transistor 334 ceases to conduct, returning to its "off" condition. The arm 362 is then returned to terminal $350_T$ to thereby reset the core of transformer 364 for the next firing burst interval. The switch arm 362, in a typical installation, dwells in the $360_T$ position for approximately 200 to 400 milliseconds. The duration of the conduction period of transistor 334 is in the range 158 to 175 milliseconds. It will be understood that during each firing burst interval, as above pointed out, approximately 10± ½ cycles are allowed to pass through the thyristors 42 and 52. The resistor 350 serves to control the rate of core 364 reset, and the diode 335 precludes reverse base current on transistor 334 during the reset period. It will be observed that diode 335 may be placed in series (335'), in shunt as shown, or in both locations. It will also be observed that transistor 334 may be of the opposite type by simply reversing circuit polarities.

The time taken for the magnetic timing arrangement defined by transformer 364 and its associated circuitry to undergo the described cycle (turning transistor 334 on and off) is very nearly a constant for each cycle. The arrangement is, accordingly, more reliable than a purely mechanical scheme wherein the required control precision would dictate costly apparatus.

Turning again to FIGURE 3a of the drawings, it will be seen that transformer 280 is coupled across the power supply lines 26 and 28, and connections are made to the secondary of transformer 280 by lines 282 and 284 to supply power to the circuit 20. Similarly, the secondary of transformer 280 through lines 286 and 288 supplies power to the motor 88 for driving the rotation arm 82.

The switch arm 362 of FIGURE 5 and the switch arm 82 of FIGURE 3a where both previously described as being driven by motor 88. In practice, it has been found convenient to control a group of 24 individual rapper coils by a rotating arm switch, such as that schematically indicated by the numeral 14 of FIGURE 3a. With this arrangement, the number of terminals 80 will obviously be 24, and accordingly the rotation of switch arm 82 will be accompanied by a changing of contact arm 362 of FIGURE 5 between the indicated terminals 24 times during each revolution of arm 82. With this arrangement, each of the 24 rapper coils in the group 16 of FIGURE 3b (shown only as 6 individual coils for purposes of illustration) will undergo the control function previously set forth.

At this point in the description of the invention, a recapitulation will now be offered setting forth the overall mode of operation.

Operating power is obtained from the transformer 30 and supplies the power control module 12 containing the thyristors 42 and 52. The pulses from these thyristors are sequentially supplied to the various rapper coils by the distributor switch. The rapping intensity of each plunger of each rapper coil is controlled by varying the energy content of the power pulses which are generated by the timing action of the circuit illustrated at FIGURE 5. The switching action of circuit 12 is controlled by the firing pulses from circuit 20, with these firing pulses operating in accordance with a timing signal from the switch arm 362 and a feedback signal from circuit 18, either alone or in combination with circuits 200 or 200'. If desired, circuits 200 and 200' may be simultaneously employed. For automatic operation in response to an external operating parameter, the rapper coil current is sensed by circuit 200 or circuit 200' in combination with circuit 18 and a small, controllable amount of this sensed current is fed to the circuit 20 to thereby control the energy content of each power pulse to each rapping coil. The control circuit 18 functions as the control intelligence center which provides an appropriate feedback signal in accordance with multiple input signals. Thus, it provides a means for injecting additional control information, such as information relating to the sparking rate or precipitator current, to accordingly modify the rapper coil intensity levels as set by the rapper coil current signals. Such a system provides for continuous and stepless control of rapping intensity from zero to a maximum, and may be readily extended to accommodate any feasible number of individual control signals.

Referring now to FIGURES 6 and 7, a modification of the previously described and illustrated circuit and the various subcombinations thereof will now be set forth. According to this modification, the single distributor switch of FIGURE 3a is made to serve a second group of rapper coils. The switch module 14 in a typical installation, as previously described, may have 24 terminals 80. This corresponds to 24 rapper coils such as coil 11 of FIGURE 2. These rapper coils may be divided into three groups having eight in each group, with resistor 116 of FIGURE 3b serving the first subgroup of eight, resistor 118 serving the second subgroup of eight, and resistor 120 serving the third subgroup of eight. In the event that it is desired to double the number of rapper coils 11, it would ordinarily be necessary to employ a switch module 14 having 48 such contacts 80. By means of the embodiment of FIGURES 6 and 7, the same distributor switch with 24 terminals 80 may be employed by virtue of the novel switching arrangement of FIGURES 6 and 7.

Referring now to FIGURE 6, the numeral 400 denotes generally a bistable firing circuit coupled to two thyristors 450 and 452, similar to thyristors 42 and 52.

The bistable firing circuit itself includes a step-down power supply transformer 402 whose primary is fed from a 115 volt, 60 c.p.s. supply and whose secondary is center tapped to line 404. The ends of the secondary are coupled to the anodes of diodes 406 and 408, with the cathodes being coupled as indicated and leading to a resistor 410 in line 412. A capacitor 414 is coupled across lines 404 and 412 as indicated. The numerals 416, 418, 420, 422, 424, 426, 428, and 430 denote elements of a conventional multivibrator circuit and their symmetrical counterparts are denoted by the same numerals with primes affixed. The operation of this portion of the circuit 400 is well know and accordingly a detailed decription will not be offered.

The numeral 432 denotes one output terminal, the numeral 434 denoted another output terminal, and the numeral 436 denotes a third output terminal of the multivibrator circuit. Line 438 is coupled as indicated to line 412 and terminates in a switch contact 438$_T$. Capacitor 440 is coupled with one terminal to line 404 and its other terminal leads to line 442, the later connected to a movable contact arm 446. Line 444 is coupled to the anode connection of diode 420 and terminates in terminal 444$_T$. Army 446 swings between the two indicated terminals under the action of motor 88 and the indicated linkage of FIGURE 7.

Referring now to the upper portion of FIGURE 6, two thyristors 450 and 452 are coupled in the indicated configuration with each thyristor provided with a capacitor 454 and resistor 456 in series, these functioning as transient suppressors. Resistor 458 is coupled in the gate circuit as indicated and serves to give proper bias to the thyristors. The input to thyristor 450 is through line 64–1 and the input to thyristor 452 is through line 64–2. The output is through common line 64.

A firing signal for the thyristors 450 and 452, which are alternately on and alternately off, is obtained from the bistable multivibrator circuit, the latter preferably packaged as a printed circuit plug-in. Only one of the transistors 416 and 416' is on at any given time. In order to transfer conduction between these two transistors, a momentary positive pulse is supplied from the charge capacitor 440 by means of the movable switch arm 446. Steering diodes 420 and 420' apply this electrical pulse to whichever transistor 416 or 416' is off, thereby turning it on. Regenerative feedback turns the transistor which is ON to the OFF conduction state. The firing pulses for the thyristors 450 and 452 are obtained from the collector to emitter voltage across the transistors 416 and 416'. Thus, a steady direct current firing signal is applied to thyristor 450 only during the time transistor 416' is off (high collector to emitter voltage). Resistor pairs 422–418' and 422'–418 provide bias and feedback requirements for the transistors 416 and 416'. Capacitors 424 and 424' function to decrease the on-off transition of the transistors 416 and 416′, and resistors 430 and 430′ limit the collector current for the transistors. The magnitude of the firing signals for thyristors 450 and 452 is limited by resistors 428 and 428′. The diodes 426 and 426′ prevent false triggering of the thyristors 450 and 452 under high temperature conditions. In a typical installation, temperature tests have shown that this circuit, as well as the circuit of FIGURE 5, is operable and stable over a range of from −25° C. to +50° C. ambient. The switch arm 446 is normally against contact 438$_T$ and whenever a firing pulse is required the switch on 446 is pushed (by means later to be described) against contact 444$_T$.

Referring now to FIGURE 7 of the drawings, the overall circuit according to this modification is illustrated. The reader will immediately recognize the previously described components and subcombinations; namely, the subcombination circuit 12 which includes the main power thyristors 42 and 52 for supplying power through line 38 to the distributor switch module 14. The numeral 16′ denotes a group of 24 rapper coils and the numeral 16″ denotes a second group of 24 rapper coils. The line 64–1 is a return line from the group 16′ and the numeral 64–2 is the return line for the group 16″. Resistor 116, shown in FIGURE 3b is illustrated to make clearer the correspondence of elements, and the numeral 122 denotes the first of a second group of resistors similar to resistors 116, 118, and 120 of FIGURE 3b.

The numeral 18′ corresponds to the circuit 18 of FIGURE 3b and the numeral 18″ denotes a similar circuit, here controlling three additional channels. It will be observed that with each rapper group 16′ and 16″ containing three subgroups of eight coils each, the elements 18′ and 18″ may be regarded as controlling three channels each with the first three channels corresponding with the coils in group 16′ and the second three channels corresponding to the group 16″.

The numeral 500 denotes a rotating wheel having 24 pins or abutments 502 corresponding with the 24 switch contacts 80 of the distribution switch. During each revolution of the element 500, the switch arm 362 of circuit 20 is actuated 24 times. The numeral 504 denotes a single pin or abutment which actuates switch arm 446 of circuit 400 only one time during each revolution.

Considering the initial operation of the system shown in FIGURE 7, rotation of wheel 500 actuates the circuit 20 through arm 362, as previously described. The linkage 86 causes sequential contact between the rotating arm 82 of switch module 14 and switch contact 80 to sequentially energize the coils in rapper coil group 16′. During this first revolution of wheel 500, thyristor 450 is conducting while thyristor 452 is non-conducting. The operation of the circuit now is completely equivalent to that previously described, with control circuit 18′ cooperating with its automatic spark sensing control circuits 200 (FIGURE 4), all as before described.

After the completion of the first revolution of wheel 500, the pin or abutment 504 actautes switch arm 446 of the bistable firing circuit shown in FIGURE 6, thus turning thyristor 450 off and thyristor 452 on. During this second revolution of wheel 500, with thyristor 452 conducting, the second group 16″ of the 24 rapper coils (the first coil 25 having been illustrated for purposes of clarity) will be energized and control circuit 18″ will cooperate with timing circuit 20 in the same way as circuit 18′ did. Circuit 18″ is provided with its own spark sensing or other operating parameter sensing circuits such as 200 or 200′. Again, all as previously described. With the second group 16′ of rapper coils employed, the feedback from circuit 18″ to the subcombination circuit 20 may be effected by providing a second coil and set of terminals completely analogous to the coil and terminals 311, 122$_T$, and 156$_T$ respectively of FIGURE 5 of the drawings. That is to say, a second primary coil, distinct from primary coil 311, may be provided for the reactor 312 of FIGURE 5.

Comparing the operation of the circuit of FIGURE 5 with circuit shown in FIGURE 3a and FIGURE 3b, it will readily be observed that the distributor switch 14 is made to supply power to two groups 16′ and 16″ of rapper coils, thus effecting a dual function with the same distributor switch 14. The reader will immediately recognize that the number of rapper groups energized by a single switch module is not limited to two, i.e., more than two lines each with its own switch 450 could be employed.

While the thyristors 42 and 52 of FIGURE 3a have been illustrated as coupled to provide a unidirectional current in line 38 passing to the distributor switch 14, it will be apparent to those skilled in this art that the concepts hereinabove disclosed are applicable with alternating current. This is to say, within the scope of the invention, alternating current could be employed to energize the various rapper coils, although the use of direct current for energizing these coils will yield superior results. In order to employ the illustrated invention for the utilization of alternating current, the configuration of the thyristors 42 and 52 need be changed only slightly in a manner well known to workers in this art to assume the so-called back-to-back configuration so that alternating current will be in line 38 instead of direct current.

What is claimed is:

1. A rapper control system for an electrostatic precipitator including:
    (a) power means for energizing a group of rapping devices which are adapted to be mounted on an electrostatic precipitator,
    (b) means for sequentially energizing from said power means each subgroup of said group of rapping devices,
    (c) control means for separately controlling energization of each of said subgroups, said control means sensing and being responsive to one or more external operating parameters of the electrostatic precipitator, such as sparking rate and current level,
    (d) means for supplying to said control means signals proportional to rapper current.

2. A rapper control system for an electrostatic precipitator including:
    (a) a network for rectifying AC power to thereby obtain DC power,
    (b) said network including phase control means for varying its electrical angle of conduction to thereby vary the average DC power passed by said network,
    (c) means for sequentially energizing from the DC output of said network each subgroup of a group of rapper devices adapted to rap electrodes of an electrostatic precipitator,
    (d) means for separately controlling the degree of energization of each of said subgroups by varying said angle of conduction.

3. The control system of claim 2 wherein said phase control means senses and is responsive to one or more external operating parameters of the electrostatic precipitator, such as sparking rate and current level.

4. A rapper control system for an electrostatic precipitator including:
    (a) power means for energizing from an AC source a group of rapping devices which are adapted to be mounted on an electrostatic precipitator,
    (b) said power means including thyristor means,
    (c) distribution switch means for sequentially and separately providing conduction, within a time interval, of power to each subgroup of rappers on an electrostatic precipitator,
    (d) timing control means for fixing the number of half-cycles of power passed by said distribution switch means from said power means to each subgroup during each time interval, and
    (e) phase control means for fixing the electrical angle of conduction of the thyristor means of said network to thereby fix the average value of each of said passed half-cycles.

5. The control system of claim 4 wherein said power means comprises a network for rectifying AC power to obtain DC power.

6. The control system of claim 4 wherein the last-mentioned means (e) senses and is responsive to one or more external operating parameters of the electrostatic precipitator, such as sparking rate and current level.

7. The control system of claim 6 wherein said power means comprises a network for rectifying AC power to obtain DC power.

8. A rapper control system for an electrostatic precipitator including:
   (a) power supply means,
   (b) a plurality of groups of rapper coils,
   (c) an input electrical line common to said groups from said power means to said groups,
   (d) a sequential distributor switch in said common input line, said distributor switch sequentially passing power from said power supply means to each group,
   (e) a separate return line from each of said groups to the power network,
   (f) an on-off switch in each said return line, said on-off switches sequentially and individually conducting,
   (g) control means for each of said on-off switches, said control means linked to said distributor switch, whereby the rapper coil groups will each be energized upon sequential cycles of the distributor switch.

9. A rapper control system for an electrostatic precipitator including:
   (a) a thyristor coupled in an input power line,
   (b) a group of rapper coils adapted to be mounted on an electrostatic precipitator,
   (c) the subgroups of said group individually coupled to distribution switch means in said line, said distribution switch means having an input terminal and a plurality of output terminals individually connected to one each of said subgroups,
   (d) a return power line coupled to each of said subgroups of rapper coils,
   (e) a means linking the thyristor and the distribution switch means to thereby determine the conduction period of the thyristor during each sequential energization of each of said subgroups from the distribution switch means,
   (f) means for bleeding off a portion of the energy fed to each subgroup,
   (g) means for controlling the conduction angle of said thyristor for each sequential energization, said means responsive to the amount of energy bled off.

10. The system of claim 9 including:
    (a) means responsive to an external operating condition such as sparking rate and current level for varying the amount of bled-off energy, to thereby vary the conduction angle of the thyristor with changes in the external operating condition.

References Cited

UNITED STATES PATENTS

| | | | |
|---|---|---|---|
| 384,775 | 6/1888 | Mengis | 310—14 |
| 2,218,164 | 10/1940 | Carpenter | 124—3 X |
| 2,854,089 | 9/1958 | White et al. | 55—112 |
| 2,863,523 | 12/1958 | Klemperer | 55—111 X |
| 2,922,085 | 1/1960 | Drenning et al | 317—139 |
| 2,978,065 | 4/1961 | Berg | 55—105 |
| 3,142,014 | 7/1964 | Zuijdendorp | 323—25 |
| 3,150,332 | 9/1964 | Norris | 332—12 |
| 3,204,172 | 8/1965 | Darling et al. | 321—8 |
| 3,215,916 | 11/1965 | Hermann | 318—122 |
| 3,241,044 | 3/1966 | Mills | 321—18 X |
| 3,243,689 | 3/1966 | Perrins | 323—24 X |
| 3,265,940 | 8/1966 | Brandell | 335—255 |
| 3,315,090 | 4/1967 | Bruffey et al. | 307—88.5 |
| 3,319,152 | 5/1967 | Pinckaers | 323—22 |
| 3,335,353 | 8/1967 | McVey et al. | 321—19 X |
| 3,354,375 | 11/1967 | Poppinger et al. | 321—5 |

OTHER REFERENCES

Glasberg, M., "Silicon Controlled Rectifiers," Electromechanical Design, vol. 6, No. 3, pp. 13–16, 19, 22–26, March 1962.

"Solid State Thyratron," Electronics engineering edition, Mar. 28, 1958, pp. 52–55.

S.S.P.I. Bulletin D420-02-8-5, Solid State Products, Inc., One Pingree Street, Salem, Mass., Feb. 8, 1965. p. 9.

HARRY B. THORNTON, Primary Examiner

D. TALBERT, Assistant Examiner

U.S. Cl. X.R.

55—139, 300; 124—3; 173—2, 90; 307—88.5; 310—30; 317—139, 157; 323—22; 335—255